June 18, 1935. R. F. PEO 2,005,004
LINK
Filed March 12, 1932
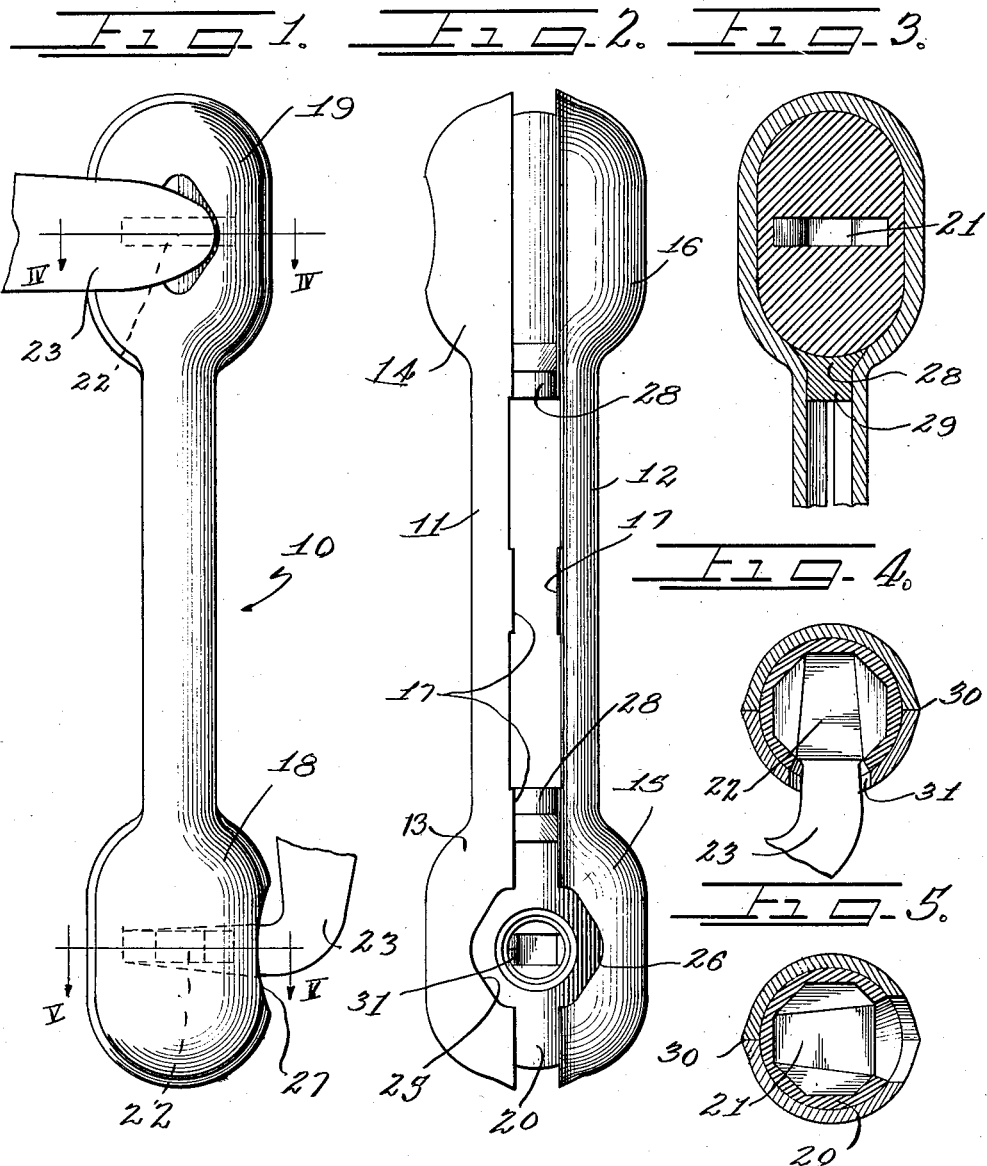
Inventor
Ralph F. Peo.
by Charles K Hill Attys.

Patented June 18, 1935

2,005,004

UNITED STATES PATENT OFFICE 2,005,004

LINK

Ralph F. Peo, Buffalo, N. Y., assignor to Houde Engineering Corporation, Buffalo, N. Y., a corporation of New York Application March 12, 1932, Serial No. 598,356

5 Claims. (Cl. 287—85)

This invention relates to connecting rods and to drag links for use in the steering mechanisms of automobiles and particularly to connecting links for shock absorbers.

It is an object of this invention to provide a drag link assembly of the type embodying joints employing resilient bushings wherein a flat head stud member is used in cooperation with the resilient bushing.

It is a further object of this invention to provide a link assembly of this type wherein the socket members have key-shaped openings for receiving the stud members and locking them in position.

It is a still further object of this invention to provide a method of assembling a drag link which can be carried out after the parts to be assembled are in place.

These and other and further important objects of this invention will be apparent from the disclosures in the specification and the accompanying drawing.

This invention (in a preferred form) is illustrated in the drawing and hereinafter more fully described.

On the drawing Figure 1 is a plan view of a drag link assembly of my invention;

Figure 2 is a view illustrating the parts of the assembly of Fig. 1 previous to assembly;

Figure 3 is a fragmentary longitudinal sectional view of a socket member;

Figure 4 is a sectional view taken substantially upon the line IV—IV of Fig. 1 with the stud member in elevation; and Figure 5 is a sectional view taken substantially upon the line V—V of Fig. 1, with the stud member removed.

As shown on the drawing the connecting link assembly of my invention is illustrated generally at 10. The drag link 10 is made of two sheet metal shell sections which have substantially semi-cylindrical intermediate portions 11 and 12 and enlarged recessed end portions 13 and 14, 15 and 16, respectively. The adjacent end edges of the shell sections have raised portions 17 the purpose of which hereinafter will appear.

When the shell sections are placed together, the enlarged recessed portions 13 and 15 form a socket member 18 and the recessed portions 14 and 16 form a socket member 19. A resilient bushing member 20, preferably made of rubber, is placed in each socket. The size of the bushing member 20 is such that it is held under compression in the socket member. Seat members 28 made of metal and shaped to fit the inner ends of the socket members and having necks 29 which extend into the channel between the shell sections serve to prevent the distortion of the bushing members and to prevent their expanding into the channel between the intermediate shell sections. These seat members also serve as supports for maintaining the shell sections in properly spaced position.

Each bushing 20 is provided with a molded slot 21 which is shaped to receive a head 22 on a stud 23. The slot 21 is preferably made of such size and shape that the stud head 22 must be forced therein. This insures that the bushing members are frictionally united to the studs and shells and consequently the subsequent angular and rotative movement of the stud with respect to the link is permitted due to the inter-particle flow of the material of the bushing member with little or no tendency to have relative surface movement or slippage between the bushing and socket or bushing and stud head.

As will be noted in Figures 4 and 5, the stud head is a flat prism. It is preferably made with an octagonal or similar cross-sectional shape. The stud thus formed fits snugly within the cavity 21 formed therefor in the bushing 20, and due to its peculiar shape lessens the tendency to surface movement between bushing and stud when the latter is moved with respect to the link.

For the reception of the stud, the socket portion 14 is preferably provided with an opening in the bottom thereof of somewhat irregular shape but whose diameter longitudinally with respect to the link is greater than its transverse diameter.

Triangular portions are cut from the adjacent end edges of the portions 13 and 15 of the shell sections forming the link, to define notches 25 and 26. When the shell sections are assembled, the notches 25 and 26 define an aperture 27 having a major axis parallel with the longitudinal axis of the link and a minor axis normal to the longitudinal axis of the link. The major axis of the aperture is longer than the major axis of the stud head 22 to permit insertion of the stud head at an angle to its operative position. The minor axis of the aperture, however, is shorter than the major axis of the stud head to prevent removal of the stud head during use.

The drag link of this invention is preferably assembled as follows:

The resilient bushing members 20 are placed in position and the socket end pieces or seat members 28 placed thereagainst in one of the shell sections. The shell sections are then forced together until the adjacent end edges abut each other, and the upstanding portions 17 are firmly welded together as by spot welding. It will be noted that the upstanding portions 17 are flared outwardly to some extent, as at 30, in order to provide a greater surface for welding. After the link and bushings have been assembled, the stud members, while turned so that the greater dimension of the head of the stud lies in alignment with the longitudinal axis of the link, are pressed into the bushing member openings 31, the pressure causing a distortion of the slot 21. When the stud has been completely inserted into the bushing member it is turned through 90° so that the flat head portion thereof lies within the preformed cavity without distortion of the bushing.

As an alternative method of assembling the link, the stud members 23 are attached to their supports. The link section having the recess portion 14 is applied to one of the studs. The bushings 20 are then applied to the studs and the shell sections pressed into abutting position and welded as before.

Among the special advantages of this invention, is the ease of assembling. It will readily be seen that the drag link shell can be welded together about the rubber bushing and thereafter the stud member inserted by a simple application of pressure and a twisting movement. Another feature is that due to the hollow construction relatively cheap sheet metal can be used for forming the shell and when the shells are welded together a sufficient bond is had to provide a strong drag link. The recessed portions are of elongated shape so as to form socket members of substantially oblate spheroid shape. The bushings are also of this shape thereby providing a greater amount of material adjacent the larger surfaces of the studs. The peculiar shape of the bushings lessens the tendency to surface movement between the bushing and socket as the stud is turned. It also provides a sufficient amount of material around the stud head to permit a ready inter-particle flow as the stud is moved.

The stud being of flat shape can be manufactured cheaply as the costly operations of forming curved surfaces are eliminated. Moreover, the flat stud fits snugly within the molded cavity and does not tend to cause surface movement between stud and bushing. The bushing offers a resistance to the turning of the stud and in this way acts to absorb some of the rattles and slight movements of the stud.

It will be understood that both ends of the shell sections may be made similar to sections 13 and 15 or both ends may be made similar to sections 14 and 16. In fact, many details of construction and arrangement of parts may be changed or modified without departing from the true spirit of this invention and I do not wish to be limited otherwise than as necessary by the prior art and the scope of the appended claims.

I claim as follows:

1. A drag link comprising a pair of shell sections having elongated recesses at their ends, said shells being welded together along their adjacent edges so that said recessed portions form elongated socket members, an elongated opening in one of said recessed portions and notches cut in the edges of the shells adjacent the recesses at the other end of the shells, said notches forming an elongated opening, an elongated resilient bushing member compressed in each of said sockets, said bushings having narrow stud receiving cavities therein located adjacent the elongated openings and in line with the smaller diameters of the openings and flat stud members insertable through the elongated openings and snugly receivable in said bushing cavities so as to permanently connect the stud members to the link.

2. A link comprising a pair of shells having recesses at the ends thereof, said shells being secured together with pairs of recesses registering so that said recesses define hollow socket members, at least one pair of said recesses having notches in adjacent edges to define an elongated opening, rubber bushing members in said sockets having cavities therein adapted to receive a stud member with a head having its major axis shorter than the major axis of said elongated opening and longer than the minor axis of said opening, said cavities being in alignment with said opening and having the long axis thereof at an angle to said opening whereby said stud head can be locked in said socket by inserting it through the socket opening and rotating it into seating position in the bushing.

3. A link comprising a pair of shells secured together to define end sockets and an integral connecting portion extending therebetween, at least one of said sockets having an elongated opening therein, a resilient bushing member encased in said socket having a narrow slot therein in alignment with the shorter axis of said elongated socket opening, a stud member having a flat head associated with said socket and locked in the slot in said bushing, said flattened head of said stud member having a diameter slightly less than the longer axis of the socket opening.

4. A link comprising a pair of sheet metal shells having enlarged recesses at the ends thereof, said shells being secured together along adjoining edges thereof to form hollow sockets from adjoining recesses and a shank connecting said sockets, elongated openings in said sockets, resilient bushings completely encased in said sockets each having an elongated cavity therein adapted to receive a stud head having a major axis shorter than the long axis of the socket opening and longer than the short axis of said opening, said bushing cavities being in alignment with the socket opening, but having their long axis at an angle to the long axis of said socket opening so that said stud head can be locked in the socket by inserting it through the socket opening lengthwise thereof and turning it through an angle into proper seating position in the bushing cavity.

5. A link comprising a pair of sheet metal shells having elongated recesses at the ends thereof and an intermediate semi-shank portion, an elongated opening in the face of one of said recesses, the recess at the other end of said shell and a recess of the other shell having notches cut in adjacent edges to define together an elongated opening lying in a plane normal to the plane containing the elongated opening of the other recess, said shells being welded together along adjacent edges to define sockets from adjoining recesses and a connecting shank from said semi-shank portion, rubber bushings encased in said sockets having elongated cavities therein in alignment with said socket openings, said cavities having their long axis at right angles to the long axis of said stud opening whereby a stud head having a major axis shorter than the long axis of the socket opening and longer than the short axis of said opening can be locked into seating position in the bushing by rotation through an angle of 90 degrees after insertion through the socket opening.

RALPH F. PEO.